United States Patent
Fornari

[19]

[11] Patent Number: 6,141,199
[45] Date of Patent: Oct. 31, 2000

[54] DEVICE FOR PROTECTING A BRAKING RESISTOR FOR LOCOMOTIVES

[76] Inventor: Manuela Fornari, Via Numa Pompilio 2, 1-20123 Milano, Italy

[21] Appl. No.: 09/282,701

[22] Filed: Mar. 31, 1999

[30] Foreign Application Priority Data

Apr. 1, 1998 [IT] Italy .................................. MI98A0696

[51] Int. Cl.[7] .............................. H02H 7/085; B60L 3/00
[52] U.S. Cl. ............................. 361/103; 361/24; 318/362
[58] Field of Search .................................. 361/23–25, 27, 361/30, 28, 20, 103, 106; 219/482, 490, 497, 504, 505; 318/362–366

[56] References Cited

U.S. PATENT DOCUMENTS

| 4,035,692 | 7/1977 | Luy et al. ................................ 361/103 |
| 4,179,646 | 12/1979 | Russell ..................................... 318/380 |
| 5,208,741 | 5/1993 | Kumar ..................................... 363/124 |
| 5,449,992 | 9/1995 | Geiger et al. ............................ 318/362 |

*Primary Examiner*—Josie Ballato
*Assistant Examiner*—Kim Huynh
*Attorney, Agent, or Firm*—Herbert Dubno

[57] ABSTRACT

A device for protecting a braking resistor for locomotives supplied with AC power obtained by chopping the DC voltage from the power grid comprising at least one pack of resistive components of the resistor which has at least one reference resistive component which is made of a different material than the other resistive components of the pack but is suitable to react thermally in the same manner as the other resistive components of the pack when it is crossed by the same current, and a control circuit which is associated with the pack of resistive components and is suitable to detect their temperature by detecting the variations in the electrical characteristics of the reference resistive component.

12 Claims, 3 Drawing Sheets

DEVICE FOR PROTECTING A BRAKING RESISTOR FOR LOCOMOTIVES

FIELD OF THE INVENTION

The present invention relates to a device for protecting a braking resistor for locomotives.

BACKGROUND OF THE INVENTION

It is known that the temperature reached in a resistor by its resistive components is currently generally detected by thermostats arranged proximate to, or in contact with one or more of the resistive components.

The temperature of the resistive components of a resistor in fact tends to rise when the components are crossed by a preset current, regardless of whether the resistive components through which the current flows are series- or parallel-connected and are cooled with natural or forced ventilation.

The use of thermostats arranged in contact with or proximate to, one or more of the resistive components entails the fact that the temperature that is detected can be influenced by many external factors and accordingly does not correspond to the temperature actually reached by the resistive components, consequently leading to their failure.

If a thermostat is directly associated with one or more of the resistive components, the technical operating characteristics of the components might in fact be modified, since their structure and configuration are altered.

If instead a thermostat is simply arranged proximate to one or more of the relative components, it does not detect the exact temperature reached by the resistive components, also due to an offset between the time when the resistive components reach the preset temperature and the time when this temperature is reported.

In this case, the delay in reporting that the temperature has been reached may allow the resistive components to reach a higher temperature, which can be fatal to their structure, causing them to burn out and accordingly fail.

U.S. Pat. No. 5,208,741 discloses a chopper circuit utilizing such resistive components and reference may be made to U.S. Pat. No. 4,035,692 for another earlier resistor protection system for use in locomotives.

OBJECTS OF THE INVENTION

The principal aim of the present invention is to eliminate the above-mentioned drawbacks of the prior art.

An important object of the invention is to provide a device for protecting a braking resistor for locomotives which is capable of detecting the temperature of the resistive components that are present in the resistor instantaneously and constantly over time, i.e. without offsets between when the actual temperature is detected and when it is reported.

Another object of the invention is to provide a device for protecting a braking resistor for locomotives, which allows reporting of an abnormal overtemperature condition on the resistor regardless of its cause, for example insufficient ventilation, abnormal current on the resistor, etcetera.

Another object of the invention is to provide a device for protecting a braking resistor for locomotives which allows to detect a leveled voltage, so that the voltage is a function of the temperature alone and is not affected by the current that circulates in the resistive components of the resistor.

Another object of the invention is to provide a device for protecting a braking resistor for locomotives which has a system for self-checking its efficiency in order to check for any operating anomalies.

SUMMARY OF THE INVENTION

These objects and others which will become apparent hereinafter are achieved by a device for protecting a braking resistor for locomotives supplied with AC power obtained by chopping the DC voltage from the power grid, characterized in that it comprises at least one pack of resistive components of the resistor which has at least one reference resistive component which is made of a different material than the other resistive components of the pack but is suitable to react thermally in the same manner as the other resistive components of the pack when it is crossed by the same current that flows through the pack of resistive components, so that in the reference resistive component the characteristic coefficient of conducting materials that expresses the variation in resistivity as the temperature varies is different from the coefficient of the resistive components of the pack, and a control circuit which is associated with the pack of resistive components and is suitable to detect their temperature by detecting the variations in the electrical characteristics of the reference resistive component the control circuit having a first means and a second means for leveling the voltage at terminals both the first and seconds means, and a third means for determining a discharging time which is longer than the charging time of the second means so as to have a voltage which is a function of the temperature alone and is not affected by the current that circulates through the resistive components.

BRIEF DESCRIPTION OF THE DRAWING

Further characteristics and advantages of the present invention will become apparent from the following description of a preferred but not exclusive embodiment of the device according to the invention, illustrated only by way of example in the accompanying drawing, wherein.

SPECIFIC DESCRIPTION

Figure 1:
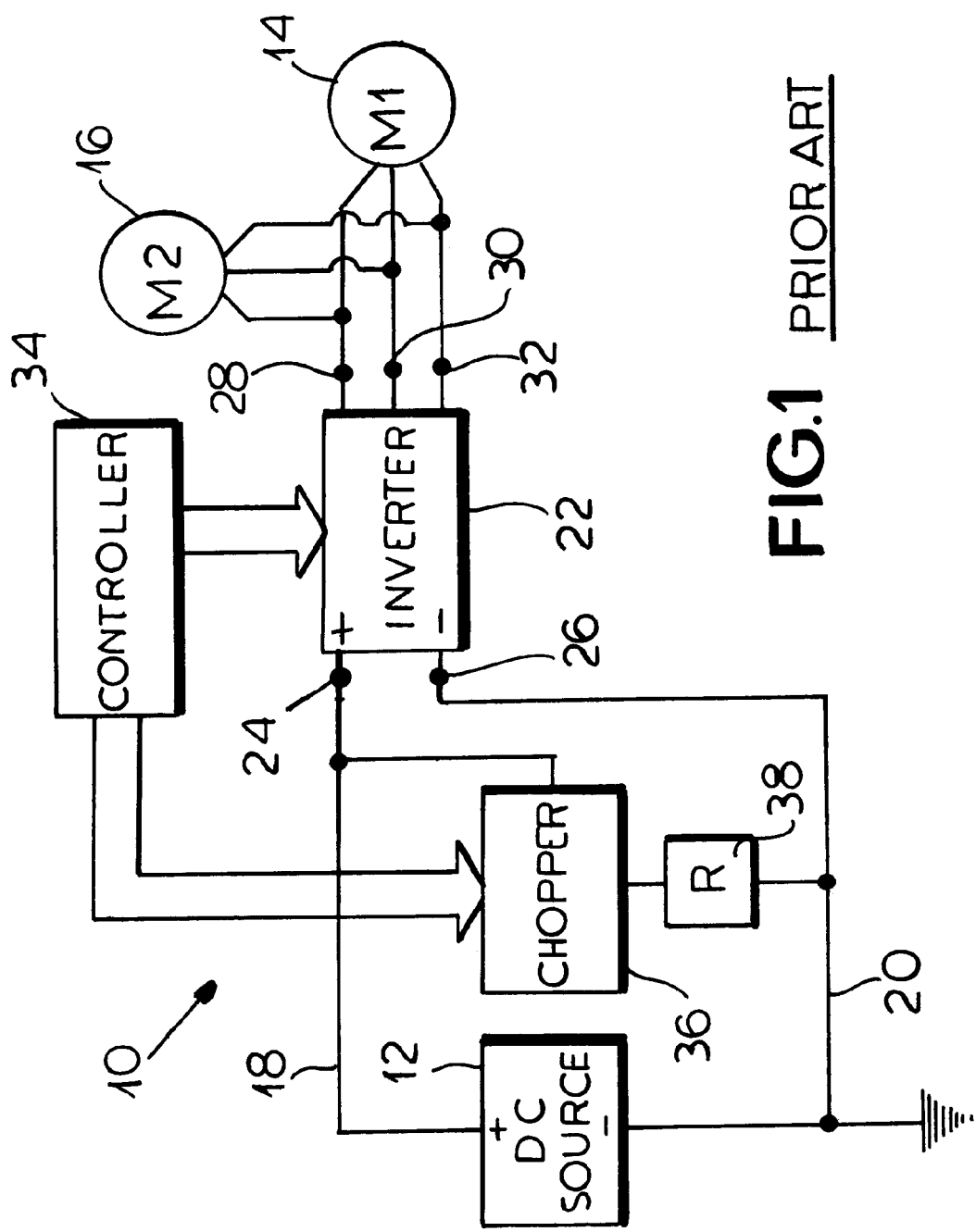
FIG. 1 is a diagram of a prior art chopper circuit for dynamic braking in an electric power conversion system in a locomotive as disclosed in U.S. Pat. No. 5,208,741.
Figure 2:
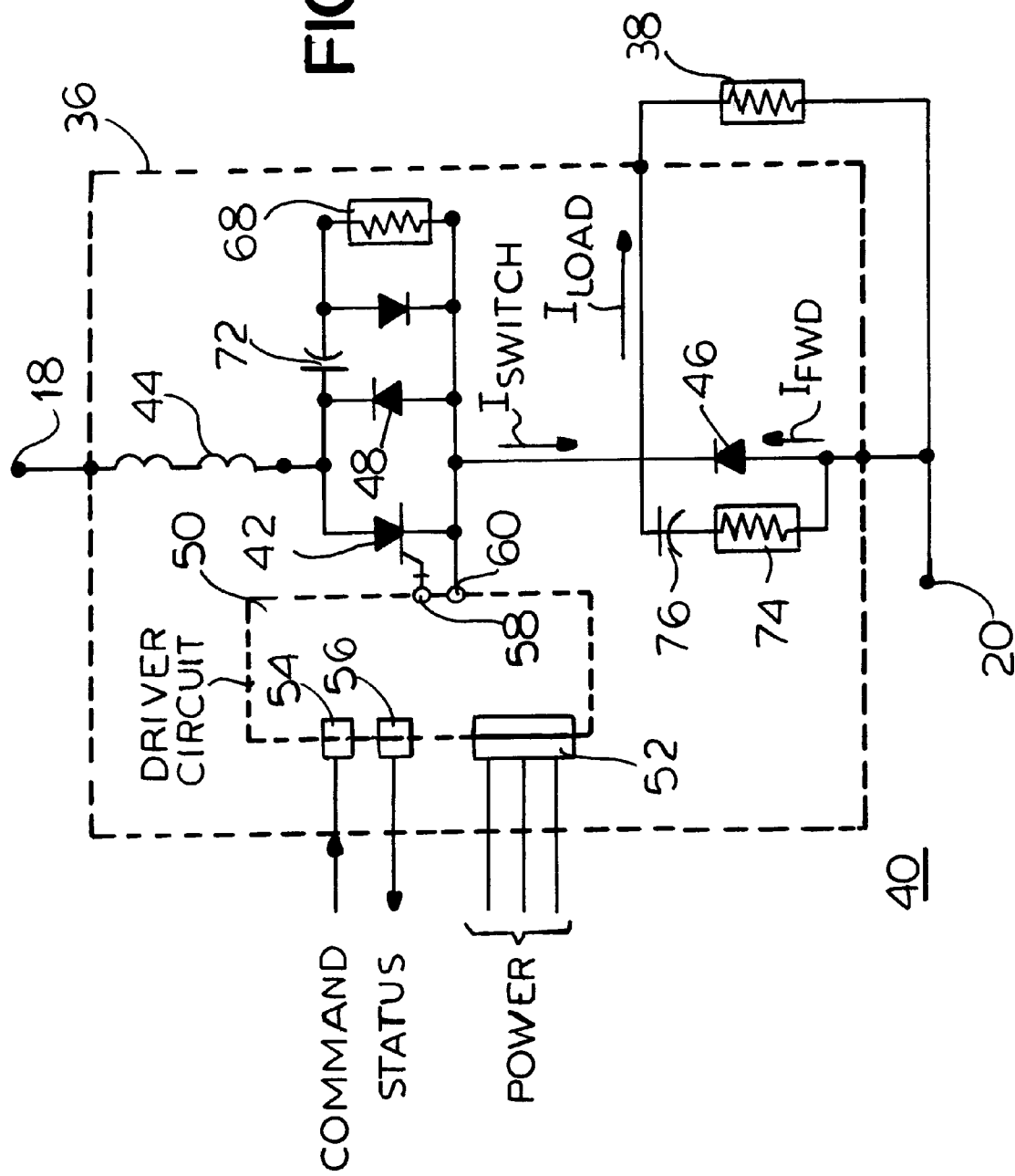
FIG. 2 is a diagram of prior art circuitry also taken from U.S. Pat. No. 5,208,741 and providing background for the instant invention.

For a complete description of FIGS. 1 and 2, reference may be had to U.S. Pat. No. 5,208,741. In FIG. 1 the power conversion system 10 comprises the DC power source 12 which is connected to an electric load such as the electric motors 14 and 16 connected in parallel and which may be motors used for propelling a locomotive. A positive conductor 18 connects the source 12 to an inverter 22 at the terminal 24 while the grounded terminal 20 is connected between the source and the inverter at a terminal 26. The AC terminals 28, 30 and 32 connect the inverter to the motors. The chopper 36 is connected in circuit with the braking resistor 38 across the source and a controller 34 is connected to the chopper and inverter.

FIG. 2 is a diagram of a dynamic braking circuit which includes the resistor 38 as well as the chopper circuit 36. The positive DC voltage conductor 18, and the negative DC voltage conductor 20, are connected to the braking circuit as shown. As is known in the art, current is applied to the braking resistor 38 through a solid stage electronic switching device, such as a power thyrister. A silicon controlled rectifier (SCR) or a gate turn-off device (GTO) are two common types of thyrister semiconductor devices which can be used for this electronic switch. A GTO 42 is used in the preferred embodiment. As will be discussed in detail below, it is common practice in the art to protect the GTO 42 against excessive instantantaneous changes in current during turn on with the use of a di/dt reactor 44 connected in series with the GTO 42. An anti-parallel diode 48, connected in inverse parallel relationship with the GTO 42, serves to protect the GTO from negative voltage spikes.

The braking resistor 38, also known as a grid resistor, is a physically large device having an extremely large power rating, i.e. in the range of 100–400 kilowatts, yet having a relatively low resistance value, i.e. on the order of 1 ohm. Since a braking resistor is typically constructed from large metallic sheets, it inherently has a large internal inductance value on the order of 200 microhenrys. As a consequence of this large inductance value, a freewheeling diode 46 is typically connected in inverse parallel relationship with the braking resistor 38 in order to conduct current through the braking resistor 38 when the GTO 42 is turned off.

Several other components are included in the chopper circuit 36. A GTO driver circuit 50 is used to interface the system controller 34 to the GTO 42. The GTO driver circuit 50 utilizes power supplied at a power connector 52, command signals available at a connector 54, to generate a status signal available at a connector 56 which is characteristic of the gate control voltage applied to the gate terminal 58 of the GTO 42. The cathode terminal of the GTO 42 is also connected to the driver circuit 50 at a terminal 60. The construction of the GTO driver circuit 50 is known in the art.

As is also known in the art, a number of "snubber" components are typically used to limit the rate of change of voltage across the various semiconductor devices. For example, a snubber capacitor 72, a snubber diode 70, and a snubber resistor 68 limit the dv/dt across the GTO 42. A snubber capacitor 76 and a snubber resistor 74 limit the dv/dt across the freewheeling diode 46.

The details of that circuit are found in the U.S. Pat. No. 5,208,741.

The device according to the invention (FIG. 3) for protecting the braking resistor for locomotives supplied with AC current produced by chopping the DC voltage of the power grid, generally designated by the reference numeral 1, comprises a plurality of packs of resistive components, only one of which will be considered for the sake of simplicity.

The pack of resistive components of the resistor has a plurality of resistive components, each designated by the reference numeral 3, between which at least one reference resistance component 4 is arranged in a position which can vary according to requirements; the reference component is advantageously made of a different material than the other resistive components 3 of the pack but is suitable to react thermally in the same manner as the resistive components 3 of the pack when crossed by the same current that flows through them.

In other words, the reference resistive component 4 has the same thermal behavior as each one of the resistive components 3 that compose the pack, since both are subjected to the same heat exchange rules, such as conduction, convection and radiation.

However, although the reference resistive component 4 has the same thermal behavior as each one of the resistive components 3, its temperature coefficient α, which is the characteristic coefficient of conducting materials that expresses the variation, in resistivity with temperature, is different from the coefficient of the resistive components 3 of the pack.

In particular, α designates the characteristic coefficient of conducting materials that expresses the variation in resistivity as the temperature varies, according to the known formula $R=RO(1+\overline{\alpha o}T)$.

Clearly, the number of reference resistive components 4 introduced in a pack of resistive components 3 varies from a minimum of 1 upward, according to design requirements and to the intended industrial use of the resistive components, arranged in series or in parallel with natural or forced ventilation.

By virtue of this solution, as will become apparent hereinafter, it is possible to detect the temperature of the resistive components 3 by using for this purpose a control circuit 5 which is associated with the pack of the resistive components by detecting the variations in the electrical characteristics of the reference resistive component 4 when the same electric current flows through the reference resistive component 4 and the resistive components 3.

Advantageously, the control circuit 5 has a first means 6 and a second means 7 for leveling the voltage across the terminals m1 and m2 of the device.

Moreover, the control circuit 5 has a third means 8 for determining a discharging time which is longer than the charging time of the second means 7, so as to have a voltage which is a function of the temperature alone and is not affected by the current that circulates in the resistive components 3.

It should also be specified that the control circuit 5 is self-powered, so that it causes, no problems during its operation, and that the first voltage leveling means includes an inductor 110.

In particular, the second voltage leveling means can include a capacitor 111 or a recirculation diode, according to requirements.

The third means that determines a discharging time which is longer than the charging time of the inductor 110 and of the capacitor 111 includes a blocking diode 112.

Figure 3:
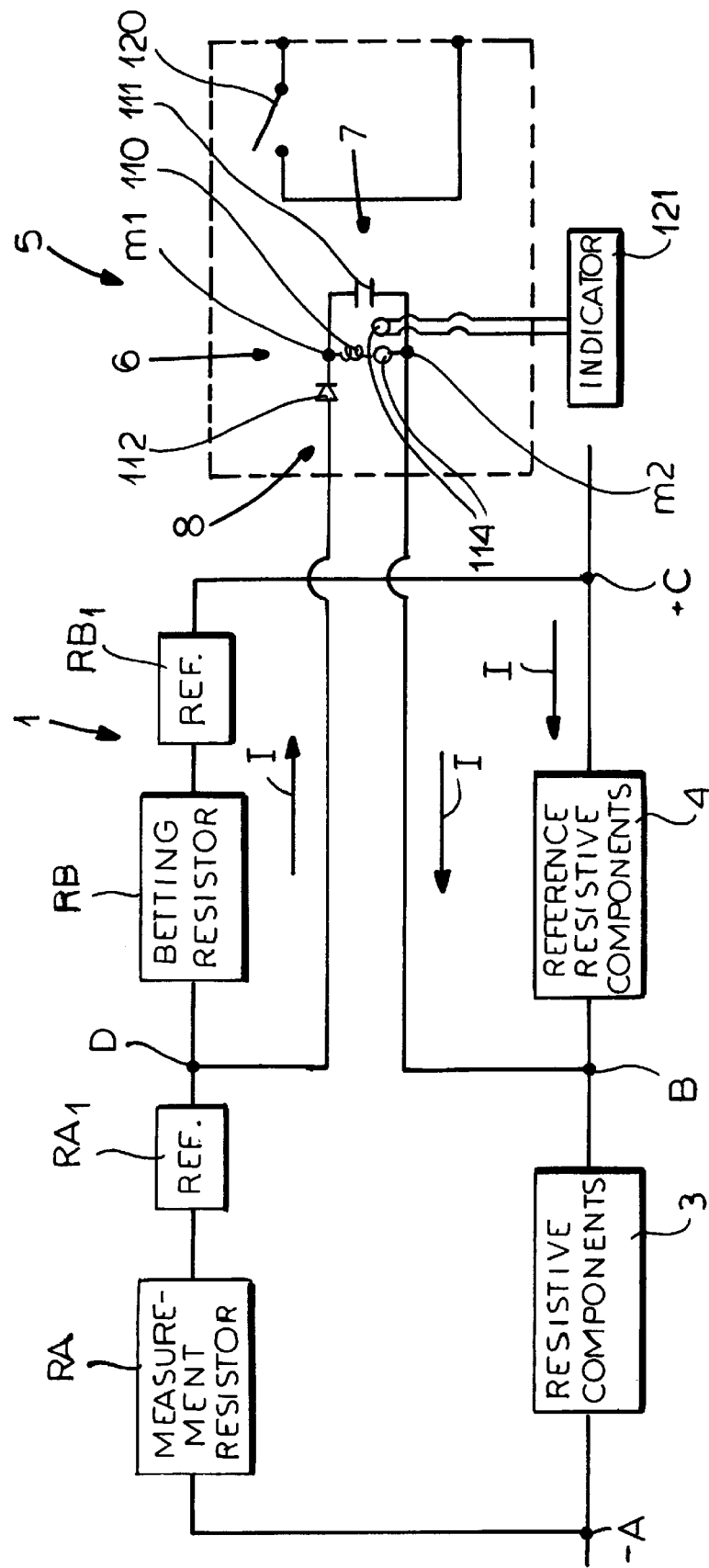
FIG. 3 is a schematic view of the circuit portion of the device which is suitable to detect a preset temperature in a plurality of resistive components of a resistor according to the present invention.

As shown in FIG. 3, the control circuit 5 further comprises a vacuum contact or reed relay and can be provided with a test or checking coil 114 which is suitable to check the operating efficiency of the control circuit before using it.

In particular, the device, as shown in the figure, is constituted by a plurality of resistive components 3 and by one or more reference resistive components 4, crossed by the same current but made of materials having a different thermal coefficient of resistivity or temperature coefficient α.

The terminals A, B and C are between the resistive components 3 and the reference resistive component or components 4; A is the negative terminal and C is the positive terminal.

The circuit further comprises measurement and setting resistors which are external to the braking resistor and are designated RA, RA1, RB and RB1; the control terminal D is arranged between them.

The direction of the current is shown by the arrows 1 in the figure.

In FIG. 3, the reference numeral 120 designates the vacuum contact or reed relay and the reference numeral 121 designates for example an indicator located inside the locomotive and connected to the control coil 114.

In particular, the control circuit, by virtue of the capacitor 111 and the inductor 110 is capable of leveling the voltage across the terminals m1 and m2 while the blocking diode 12 allows to have different time constants T1 and T2 for charging and discharging the capacitor 111, in which T1, i.e., the charging time constant, must be as small as possible while T2, the discharging time coefficient, must be as large as possible.

The present invention also relates to a method for protecting a braking resistor for locomotives supplied with AC current obtained by chopping the DC voltage of the power grid.

The method consists in arranging, in at least one pack of resistive components of the resistor, at least one reference relative component which is suitable to react thermally in the same manner as the other resistive components of the pack when it is crossed by the same current that flows through the pack of resistive components.

Conveniently, the reference resistive component is made of a different material than the other resistive components of the pack, so that in the reference resistive component the characteristic coefficient of conducting materials that expresses the variation in resistivity with temperature is different from the coefficient of the resistive components of the pack.

In this manner it is possible to detect the temperature of the resistive components of the pack simply by detecting the variations in the electrical characteristics of the reference resistive component by means of a control circuit.

Conveniently, the control circuit allows reading of a voltage which is a function of the temperature alone and is not affected by the current that circulates in the resistive components, by virtue of the presence of an inductor, a capacitor and a blocking diode in the circuit.

Moreover, the control circuit is self-powered, so as to be extremely simple and reliable.

In practice it has been observed that the device according to the present invention is particularly advantageous, in that it allows to know at all times the value of the temperature of the plurality of resistive components and therefore to prevent them from reaching or exceeding a preset temperature which would cause them to possibly burn out.

This temperature detection method, in addition to being extremely simple and functional, is fully immune to external or random influences.

The invention thus conceived is susceptible of numerous modifications and variations, all of which are within the scope of the inventive concept; all the details may also be replaced with other technically equivalent elements.

In practice, the materials used, as well as the dimensions, may be any according to requirements and to the state of the art.

What is claimed is:

1. A device for protecting a braking resistor for locomotives supplied with AC power obtained by chopping the DC voltage from the power grid, said device comprising at least one pack of resistive components of the resistor which has at least one reference relative component which is made of a different material than the other resistive components of the pack but is suitable to react thermally in the same manner as the other resistive components of the pack when it is crossed by the same current that flows through the pack of resistive components, so that in the reference resistive component the characteristic coefficient of conducting materials that expresses the variation in resistivity as the temperature varies is different from the coefficient of said resistive components of the pack, and a control circuit which is associated with said pack of resistive components and is suitable to detect the temperature of the pack of resistive components by detecting the variations in the electrical characteristics of said reference resistive component, said control circuit having a first means and a second means for leveling the voltage at the terminals connected to both said first and second means, and a third means for determining a discharging time which is longer than a charging time of said second means, so as to have a voltage which is a function of the temperature alone and is not affected by the current that circulates through said resistive components.

2. The device according to claim 1 wherein said control circuit is self-powered.

3. The device according to claim 1 wherein said first voltage leveling means comprises an inductor.

4. The device according to claim 1 wherein said second voltage leveling means comprises a capacitor.

5. The device according to claim 1 wherein said third means comprises a blocking diode.

6. The device according to claim 1 which comprises at least one control coil for checking its operating efficiency before using it.

7. A method for protecting a braking resistor for locomotives powered with AC current obtained by chopping the DC voltage of the power grid, said method comprising: arranging, in at least one pack of resistive components of the resistor, at least one reference resistive component which is suitable to react thermally in the same manner as the other resistive components of the pack when it is crossed by the same current that flows through the pack of resistive components, said reference resistive component being made of a different material than the other resistive components of the pack, so that in said reference resistive component the characteristic coefficient of conducting materials that expresses the variation in resistivity as the temperature varies is different from the coefficient of the resistive components of the pack; detecting the temperature of said resistive components of the pack by detecting the variations in the electrical characteristics of the reference resistive component by means of a control circuit which has a first means and a second means for leveling the voltage at terminals connected to said first and second means; and a third means for determining a discharging time which is longer than the charging time of said second means, so as to have a voltage which is a function of the temperature alone and is not affected by the current that circulates in said resistive components.

8. The method according to claim 7 wherein, when a preset temperature is reached, the power supply of the resistor with a chopped constant voltage is disconnected.

9. The method according to claim 7, characterized in that said control circuit is self-powered.

10. The method according to claim 7 wherein said first voltage leveling means comprises an inductor.

11. The method according to claim 7 wherein said second voltage means comprises a capacitor.

12. The method according to claim 7 wherein said third means comprises a blocking diode.

* * * * *